United States Patent
Axelsson et al.

(10) Patent No.: US 8,769,366 B2
(45) Date of Patent: Jul. 1, 2014

(54) METHOD AND APPARATUS FOR ACK/NACK REPORTING

(71) Applicant: Telefonaktiebolaget LM Ericsson (publ), Stockholm (SE)

(72) Inventors: Hakan Axelsson, Linköping (SE); Johnny Ahl, Linghem (SE); Paul Schliwa-Bertling, Ljunsbro (SE); Lars Sohl, Linköping (SE); Hans Torstensson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 13/904,599

(22) Filed: May 29, 2013

(65) Prior Publication Data

US 2013/0262951 A1 Oct. 3, 2013

Related U.S. Application Data

(63) Continuation of application No. 12/556,213, filed on Sep. 9, 2009, now Pat. No. 8,473,800.

(60) Provisional application No. 61/151,614, filed on Feb. 11, 2009.

(51) Int. Cl.
*H04L 1/18* (2006.01)

(52) U.S. Cl.
USPC .......................... 714/748; 370/236

(58) Field of Classification Search
USPC .......... 370/328, 474, 236, 394; 714/748, 749, 714/750
See application file for complete search history.

(56) References Cited

U.S. PATENT DOCUMENTS

| 7,940,771 B2 * | 5/2011 | Lee et al. ..................... 370/394 |
| 8,341,478 B2 * | 12/2012 | Timner et al. ................. 714/748 |
| 2008/0056303 A1 | 3/2008 | Sebire et al. |
| 2009/0098866 A1 | 4/2009 | Timner et al. |
| 2010/0153804 A1 | 6/2010 | Cai et al. |
| 2010/0284338 A1 | 11/2010 | Persson et al. |
| 2011/0170488 A1 | 7/2011 | Chitrapu et al. |

FOREIGN PATENT DOCUMENTS

| CN | 101083805 A | 12/2007 |
| CN | 101222309 A | 7/2008 |
| EP | 1919116 A2 | 5/2008 |
| WO | WO 2007/069959 | 6/2007 |
| WO | WO 2008/097148 | 8/2008 |
| WO | WO 2007/120090 | 10/2009 |

OTHER PUBLICATIONS

3GPP TS 44.070 V8.3.0 (Dec. 2008), pp. 1-574.

(Continued)

*Primary Examiner* — David Ton
(74) *Attorney, Agent, or Firm* — Nixon & Vanderhye P.C.

(57) ABSTRACT

A method, node, and system are provided that overcome problems with using inaccurate estimates of a current round trip time RTT for verifying the ACK/NACK information received in an ACK/NACK report, e.g., a piggy-backed ACK/NACK (PAN). This is accomplished by de-coupling the RTT from the ACK/NACK analysis performed in the sending node that receives the ACK/NACK report. As a result, unnecessary re-transmissions are avoided, communication delays are decreased, and spectrum and other system resources are used more efficiently.

7 Claims, 8 Drawing Sheets

(56) References Cited

OTHER PUBLICATIONS

International Search Report and Written Opinion mailed May 12, 2010 in corresponding PCT Application No. PCT/EP2010/050049.
Lironi et al., "Provision of Conversational Services over the GERAN: Technical Solution and Performance", IEEE International Symposium on Personal, Indoor and Mobile Radio Communications, Sep. 1, 2007, pp. 1-5, XP031168864.
3GPP TS 44.060, Mobile Competence Centre; No. V8.3.0, Dec. 1, 2008, pp. 1-574, XP05038748.
Notification of Transmittal of the International Preliminary Report on Patentability and IPRP in corresponding PCT Application No. PCT/EP2010/050049, dated May 17, 2011, 15 pages.
Office Action in corresponding Mexican Patent Application No. MX/a/2011/007201 dated Sep. 18, 2012.
Chinese Office Action mailed Aug. 2, 2013 in Chinese Patent Application No. 201080007868.4.
Chinese Search Report dated Jul. 12, 2013 in Chinese Patent Application No. 201080007868.4.
3GPP TS 44.060 v8.3.0 (Dec. 2008)—Release 8, Digital Cellular Telecommunications System; General Packet Radio Service; Mobile Station; Radio Link Control/Medium Access Control Protocol.

* cited by examiner

METHOD AND APPARATUS FOR ACK/NACK
REPORTING

PRIORITY APPLICATION

This application is a continuation application claiming priority from U.S. application Ser. No. 12/556,213, filed Sep. 9, 2009, which claims priority to U.S. provisional application Ser. No. 61/151,614, filed on Feb. 11, 2009, the entire contents of which are hereby incorporated herein by reference.

TECHNICAL FIELD

The technical field relates to telecommunications, and particularly, to Acknowledgment/Negative Acknowledgment reporting.

BACKGROUND

A mobile radio communication system includes a mobile radio communication network communicating with mobile terminals or UEs (User Equipments) and with external networks. Traditionally, communications are facilitated using one or more radio base stations that provide radio coverage for one or more cell areas and control traffic to and from a cell in the system. Base stations and the mobile terminals are able to send and receive data blocks, which may comprise sequence numbers, to and from each other.

Within the framework of GSM EDGE Radio Access Network (GERAN) in 3GPP, an event-based protocol uses ACK/NACK messages that are "piggy-backed" on data packets being sent in the opposite link direction. An event is an error in the transmission detected by the receiver. According to 3GPP/GERAN 44.060, ver. 8.3.0, a Piggy-Backed ACK/NACK (PAN) report can be sent from the mobile station (MS) and/or from the base station system (BSS). The PAN report is included in the feature Fast Ack/Nack Reporting (FANR) which is part of EDGE Evolution in Release-7 of 3GPP/GERAN.

These piggy-backed ACK/NACK reports (PANs) can include a combination of Block Sequence Numbers (BSN) that identify outstanding radio data blocks and bitmaps giving ACK/NACK information of radio blocks after a specified BSN. A PAN report can include a Beginning-Of-transmission Window bit (BOW), a Starting transmitted data block Sequence Number (SSN), and an ACK/NACK bitmap (reported bitmap RB). FIG. 1 shows the different fields in a PAN report as specified in 3GPP/GERAN. The BOW field indicates whether the beginning of the window (i.e., the blocks before the SSN) is covered by the PAN report or not. The Short SSN field is the data block number of where the PAN report starts. The ACK/NACK bitmap field (reported bitmap RB) includes the actual ACK/NACK bits where each bit indicates an ACK or NACK of a certain data block specified by the Short SSN plus the position of the bit in the ACK/NACK bitmap RB. A transmit format indicator (TFI) may also be included.

The transmission of data and the PAN report from the sender to the receiver takes a certain amount of time referred to as a PAN round trip time (RTT) which includes the time associated with the sender sending a data block, the receiver receiving the data block, the data block being processed to determine if it is correctly received, generating an ACK/NACK message for that data block, transmitting the ACK/NACK message, and receiving the ACK/NACK message back at the sender. Data and PAN reports can be sent in the uplink (UL) and/or downlink (DL) direction simultaneously, which means they can be in transmission at the same time. Therefore, the sender may have just sent some data while the intended receiver of that data may have sent a PAN report back to the sender. A problem with this situation is that the sender can not know whether the data it sent arrived at the receiver before or after the PAN report was sent by the receiver.

One approach to solving this problem in 3GPP/GERAN is for the base station to inform the mobile station what round trip time (RTT), as defined above, is for that particular mobile station. The mobile station may then use that RTT when calculating whether a specific bit in the ACK/NACK bitmap (reported bitmap RB) indicating an ACK for a block or a NACK for a block is valid or not. In the current implementation for the GERAN standard, this estimated RTT is broadcasted in a semi-static fashion by the base station to all mobiles stations in a given cell with the name "BS_CV_MAX." But a serious drawback with this approach is that the actual RTT can vary substantially both between (different types of) cells and within a given cell over time, for example, due to transport load (e.g., high load during the day, low load during night, etc.) or transport type (e.g., optical cable, microwave, satellite, etc.).

This variance in actual current RTT from the broadcast RTT produces two problems. One is that a broadcast RTT longer than the actual RTT causes NACKs to be improperly ignored. The other is that a broadcast RTT shorter than the actual RTT causes unnecessary retransmissions of data blocks. These RTT variances are particularly problematic, although not limited to, situations where data is sent uplink from the mobile station to the base station, and PANs are sent downlink from the base station to the mobile station.

FIG. 2 helps illustrate the first problem in a GERAN context. In the first scenario (solid lines), the mobile station (MS) sends a data block X that the base station system (BSS) should have received at time 2), unless it was lost or corrupted in transmission. The BSS sends a PAN that the MS receives at time 4). Since the PAN is received after the BS_CV_MAX (the broadcast RTT) expires, a NACK is registered for the data block X not properly received in time by the MS. The MS then responds to the NACK by retransmitting data block X.

In the second scenario (dotted lines) shown in FIG. 2, the MS sends a data block Y that the BSS should have received at time 1), unless it was lost or corrupted in transmission. The BSS sends a PAN that the MS receives at time 3). Since the PAN is received before the BS_CV_MAX (the broadcast RTT) expires, the MS ignores a NACK for the data block Y and does not retransmit block Y. This action by the MS is based on the assumption that BS_CV_MAX (the broadcast RTT) matches the broadcast RTT (an estimate) with the actual RTT and that in this case the BSS could not have received the data block Y before sending the PAN to the MS. This second scenario of a BS_CV_MAX (the broadcast RTT) being longer than the actual RTT is common in real life EDGE and EDGE Evolution deployments.

FIG. 3 shows a scenario where MS sends a data block Z and the BSS sends two different PANs and where the BSS broadcasted RTT (BS_CV_MAX) defines a certain timer value for the MS. When the MS receives a PAN at time 3) sent at time 1), as shown with dotted lines, the MS validates the ACK/NACK information in the PAN with respect to the BS_CV_MAX (the broadcast RTT) and concludes that the data block Z should have been received. But because the actual RTT is longer than BS_CV_MAX (the broadcast RTT), the BSS does not explicitly NACK data block Z. However, the BSS nevertheless sets the NACK bit for data block Z in the PAN bit map RBB to "not received," even though the actual RTT has not yet expired and it is not yet possible for the MS to determine whether data block Z was properly received. The MS wrongly concludes that the BSS should have received data block Z (RTT check) and that data block Z has been lost. As a result, the MS re-transmits data block Z unnecessarily. This scenario is an example of a BS_CV_MAX (broadcast RTT) being shorter than the actual RTT.

In addition, the MS will be confused when the PAN is received at later time 4) corresponding to the actual RTT indicating that data block Z is ACKed. This may cause the complete PAN report to be discarded since this is the specified action to be taken in case a NACK from one PAN report is changed to ACK in consecutive PAN reports.

These examples demonstrate that some data blocks successfully received by the BSS are unnecessarily re-transmitted. This results in wasted bandwidth, decreased spectrum efficiency, increased delays, negative end-user performance, and unnecessary use of processing and transceiving resources. One example also shows that some data blocks not successfully received by the BSS are never re-transmitted. This results in very large delays and negative end-user performance.

SUMMARY

A method, node, and system are provided that overcome problems with using inaccurate estimates of a current round trip time RTT (e.g., BS_CV_MAX) for verifying the ACK/NACK information received in an ACK/NACK report, e.g., a piggy-backed ACK/NACK (PAN). This is accomplished by de-coupling the RTT from the ACK/NACK analysis performed in the sending node that receives the ACK/NACK report. A "void" message is used in the ACK/NACK report instead of a "not received" message for the blocks where no information is available. As a result, unnecessary re-transmissions are avoided, communication delays are decreased, and spectrum and other system resources are used more efficiently.

An acknowledgement (ACK)/negative acknowledgement (NACK) report is provided from a first sending radio node to a second receiving radio node, where the first sending radio node transmits over a radio channel data blocks to the second receiving radio node. The second receiving radio node receives a signal from the first sending radio node and detects that some data blocks are correctly received and some data blocks are not correctly received. An ACK/NACK message is then generated identifying correctly received data blocks as void and not correctly received data blocks as NACKed, where void means that the second receiving radio node does not confirm that a data block is correctly received. The second receiving radio node sends the ACK/NACK message to the first sending radio node. The first sending radio node receives and decodes the ACK/NACK message and then sets the data blocks identified as NACKed to be retransmitted by the first sending radio node. The first sending radio node transmits the data blocks set to be re-transmitted to the second receiving radio node. In an example implementation, the first sending radio node immediately generates a request to retransmit data blocks identified as NACKed and performs no ACK/NACK request operation for data blocks identified as void.

Significantly, the first sending radio node's determination of which data blocks to re-transmit is independent of a round trip time (RTT) associated with the first radio node sending a data block, the second radio node receiving the data block, the data block being processed to determine if it is correctly received, generation of an ACK/NACK message for that data block, transmitting the ACK/NACK message, and receiving the ACK/NACK message at the first radio node. As a result, neither the first nor the second radio node need to determine a current RTT between them to perform the operations described above.

In example non-limiting scenarios, the first sending radio node is a mobile radio station and the second receiving radio node is a base station or the first sending radio node is a base station and the second receiving radio node is a mobile radio station.

In an example GERAN implementation, one or both of the detecting and report generating operations can be performed in a base station control node that controls the base station. Alternatively, they can be performed by the base station itself. The ACK/NACK message is a piggy-backed ACK/NACK (PAN) message sent with a data block which includes a starting sequence number for a sequence of transmitted data blocks associated with the PAN message, each data block having an associated sequence number, and a reported bit map in which each transmitted data block includes a corresponding bit that indicates whether that data block is void or NACKed. Other example ACK/NACK messages include a Packet Uplink Ack/Nack message or a Packet Downlink Ack/Nack message. Both of the detecting and generating operations may be performed in the base station or one or more of those operations may be performed in a base station controller controlling one or more base stations.

In one detailed example implementation, none of the data blocks in the ACK/NACK message are identified as ACKed.

DETAILED DESCRIPTION

Figure 1:
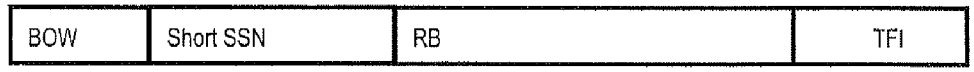
FIG. 1 is an example of a PAN report.
Figure 2:
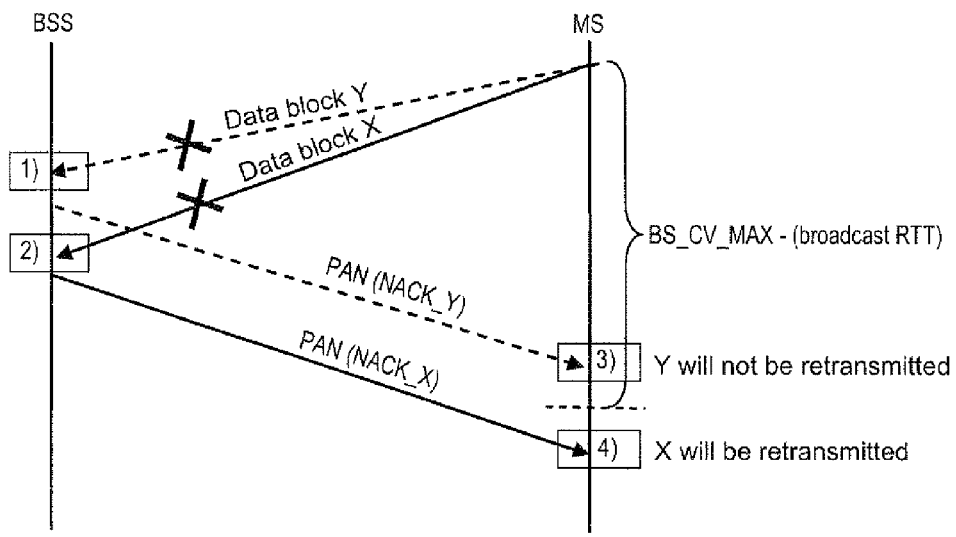
FIGS. 2 and 3 illustrate example PAN situations that produce undesirable responses from the data block sender/PAN receiver.
Figure 3:
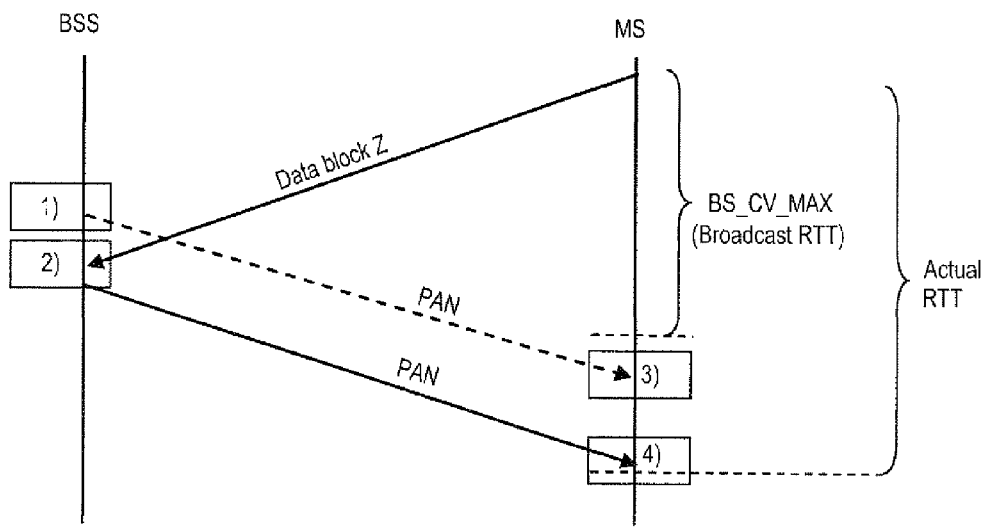

In the following description, for purposes of explanation and not limitation, specific details are set forth such as particular architectures, interfaces, techniques, etc. However, it will be apparent to those skilled in the art that the claimed technology may be practiced in other embodiments that depart from these specific details. That is, those skilled in the art will be able to devise various arrangements which, although not explicitly described or shown herein, embody the principles of the claimed technology and are included within its spirit and scope. In some instances, detailed descriptions of well-known devices, circuits, and methods are omitted so as not to obscure the description of the present invention with unnecessary detail. All statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein represent conceptual views of illustrative circuitry embodying the principles of the technology. Similarly, it will be appreciated various processes and functions described may be substantially represented in a computer-readable medium and can be executed by a computer or processor.

The functions of the various elements including control-related functional blocks may be provided through the use of electronic circuitry such as dedicated hardware as well as computer hardware capable of executing software. When provided by a computer processor, the functions may be provided by a single dedicated processor, by a single shared processor, or by a plurality of individual processors, some of which may be shared or distributed. Moreover, a processor or controller may include, without limitation, digital signal processor (DSP) hardware, ASIC hardware, read only memory (ROM), random access memory (RAM), and/or other storage media.

A mobile terminal connection logically represents the communication between a mobile terminal and one cell in the radio access network, and a radio link provides the actual physical radio connection between the mobile terminal and a base station associated with the cell. The mobile terminal may be represented, e.g., by a mobile station, a wireless communication terminal, a mobile cellular telephone, a Personal Communications Systems terminal, a Personal Digital Assistant (PDA), a laptop, a computer, or any other kind of device capable of radio communications.

A main advantage of the technology described below is that it is not necessary for ACK/NACK reports to be linked to or based on an estimated RTT. This solves a large problem for real deployments since it is in practice not possible to estimate RTT with the accuracy needed to avoid the problems noted in the background section. Unnecessary and/or omitted re-transmissions are thus avoided thereby decreasing delay and more efficiently using spectrum and other system resources.

Figure 4:
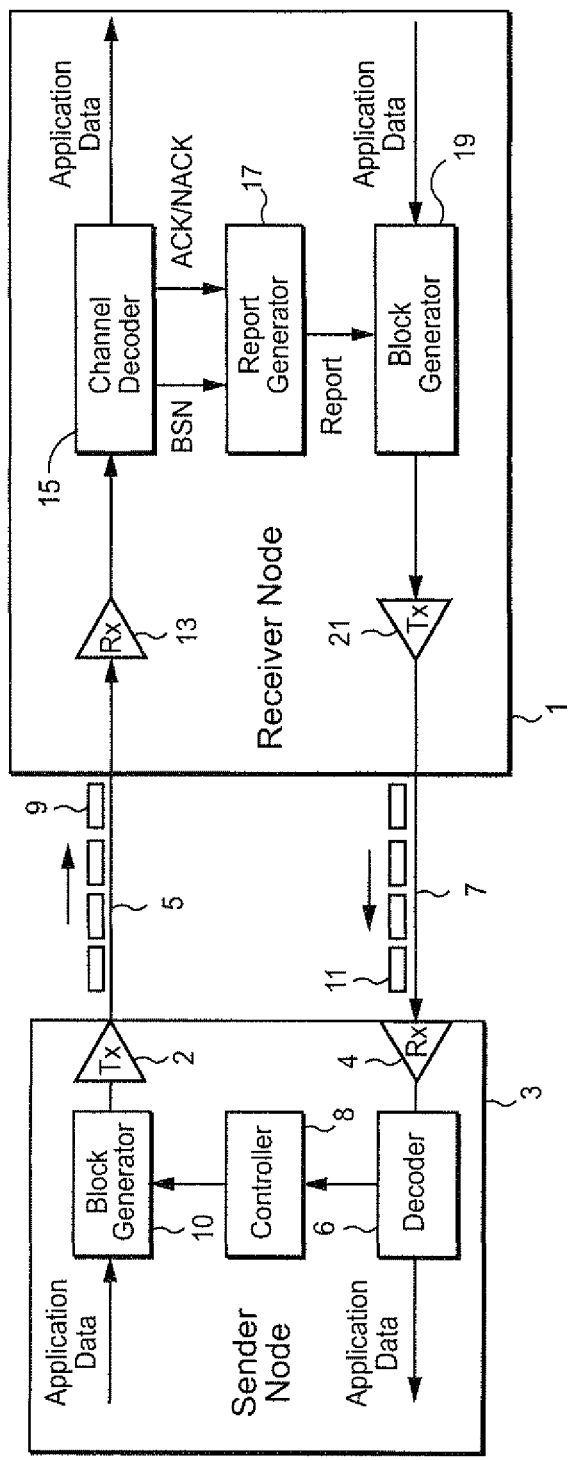
FIG. 4 illustrates an example function block diagram of sender and receiver nodes that may be used in conjunction with the technology described in this application.

FIG. 4 is a function block diagram illustrating communications with data block ACK/NACK reporting between two transceiving units. The sending node 3 sends via a transmitter application data in the form of data blocks 9 over a first communications link 5 to a receiving node 1. A data block generator 10 receives application data and generates data blocks to be transmitted by a transmitter 2. Each data block 9 in the sequence of data blocks typically includes a header and a payload. The header usually includes a data address specifying a recipient of the data block as well as a block sequence number (BSN) which specifies an intended position for the data block in the sequence of data blocks. Consequently, BSN equals 0 for the first data block in the sequence, BSN equals 1 for the second data block in the sequence, and so forth. In order to achieve error detection and/or correction in data blocks, redundancy information is often added, e.g., cyclic redundancy check (CRC) fields may be added.

In the receiving node 1, a channel decoder 15, connected to a receiver 13, tries to decode each received data block 9. If the decoding is successful, the channel decoder 15 outputs application data included in the received data block. The channel decoder 15 provides a report generator 17 with the block sequence number of each data block received by the receiver, provided of course that the received data block is actually received and not corrupted. Along with the BSN, the channel decoder 15 also provides the report generator 17 with ACK/NACK information relating to the data block associated with the provided BSN, i.e., information on whether or not the information associated with the provided BSN is successfully received. Based on the BSN and ACK/NACK information provided by the channel decoder 15, the report generator 17 generates ACK/NACK reports in a predetermined format. An example of such a report format was shown in FIG. 1.

A block generator 19 receives application data that is intended for transmission to the sending node 3 and generates a sequence of data blocks that include the received application data. One or more of the data blocks 11 includes the report generated by the report generator 17. The report is thus "piggy-backed" onto one of the generated data blocks 11.

The sending node 3 includes a receiver 4 which provides the data blocks 11 received over link 7 to a decoder 6 that decodes the data blocks to extract application data and to detect the report piggy-backed on one of the data blocks. The decoder 6 also sends an ACK/NACK report to a controller 8 which identifies data blocks to be retransmitted and schedules their retransmission via the block generator 10 and the transmitter 2.

Figure 5:
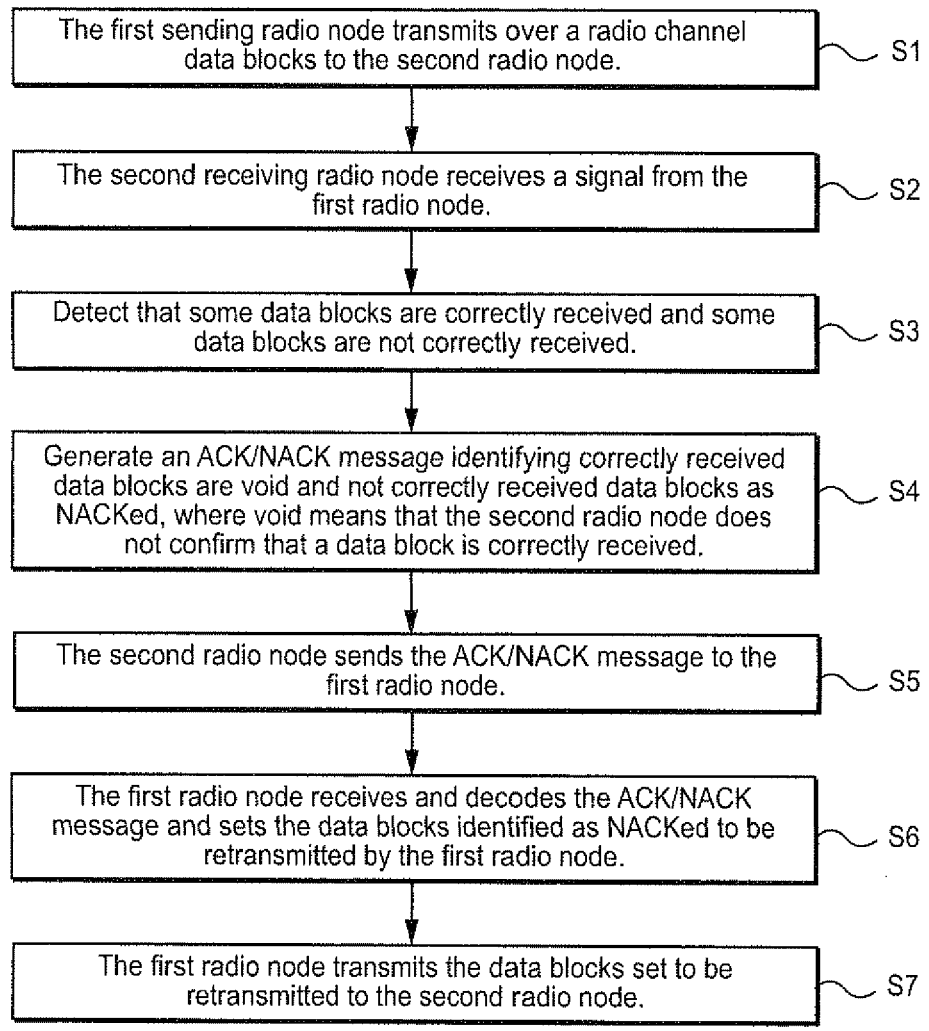
FIG. 5 is a flowchart diagram illustrating non-limiting example procedures in accordance with technology described in this application.

Reference is now made to the non-limiting flowchart diagram in FIG. 5. The first sending radio node transmits over a radio channel data blocks to the second receiving radio node (step S1). The second receiving radio node receives a signal from the first sending radio node (step S2), and detects that some data blocks are correctly received and some data blocks are not correctly received (step S3). An ACK/NACK message is generated identifying correctly received data blocks as "void," not correctly received data blocks as NACKed, and blocks not yet received as "void." The term "void" means that there is no information for the data block, and therefore, the second receiving radio node does not confirm that a data block is correctly received (step S4). The second receiving radio node sends the ACK/NACK message to the first sending radio node (step S5), and the first radio node receives and decodes the ACK NACK message. Those data blocks identified as NACKed are set to be retransmitted by the first radio node (step S6). Those data blocks identified as void are left with an unchanged state, which means they will not be re-transmitted based on this ACK/NACK message. The transmitter in the first sending radio node then transmits the data blocks set to be retransmitted to the second receiving radio node (step S7).

Significantly, the first sending radio node's determination of which data blocks to retransmit is independent of a roundtrip time (RTT) associated with the first radio node sending a data block, the second radio node receiving the data block, the data block being processed to determine if it is correctly received, generation of an ACK/NACK message for that data block, transmitting the ACK/NACK message, and receiving the ACK/NACK message at the first radio node. As a result, neither the first nor the second radio node needs to determine a current RTT between them to perform the operations described in FIG. 5.

The transceiving nodes 1 and 3 in FIG. 4 may be radio transceivers used in a wireless communication such as those specified by a wireless communications standard, non-limiting examples of which include the GSM, GPRS, EDGE, and GERAN standards. The technology is not limited to a particular type of communication system or standard and may also be employed in a wide range of cellular systems which use functions similar to those described in this application, although different terminologies may be used in other systems. Moreover, although example below assumes that the mobile station is the sending node and the base station is the receiving node, the mobile station may be the receiving node and the base station may be the sending node.

Figure 6:
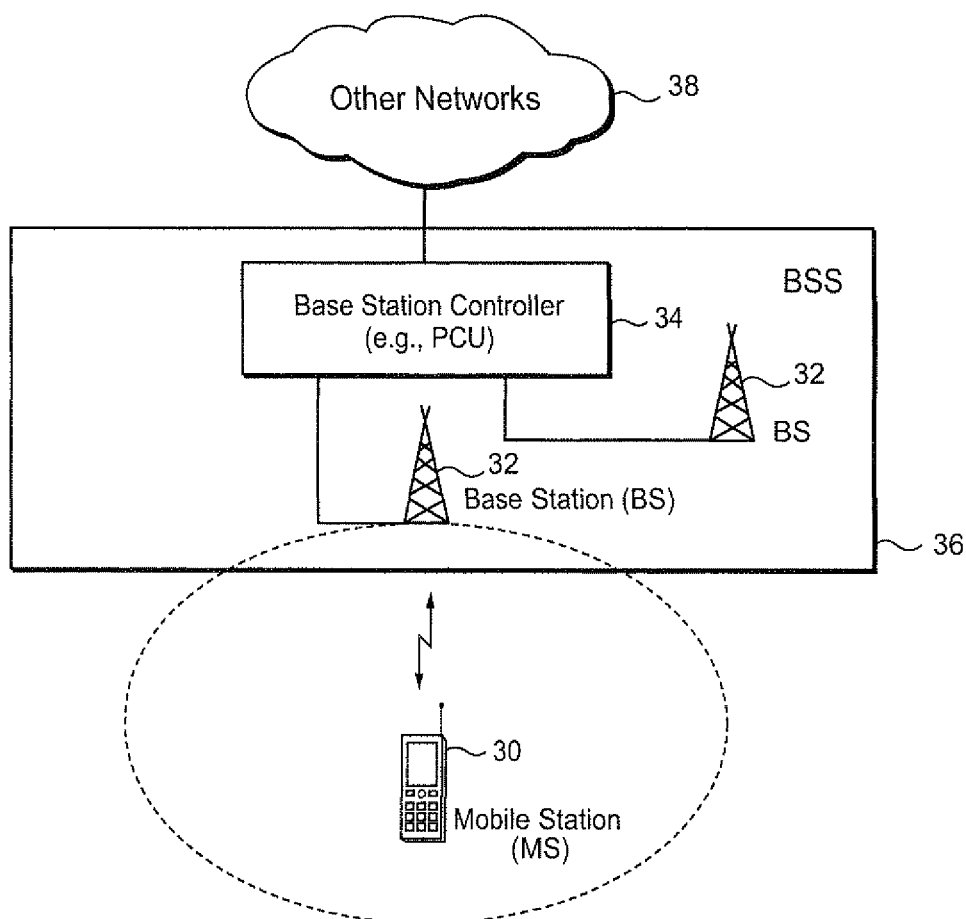
FIG. 6 is a function block diagram illustrating an example radio communications system in which the technology of this application can be employed.

FIG. 6 illustrates a non-limiting, example radio communication system that comprises a radio access network 36 showing two base stations (BS) 32 coupled to a base station controller (BSC) 34. In GSM/EDGE parlance, the combination of a base station controller and its base stations is referred to as a base station system (BSS). The radio access network 36 communicates with other networks represented by cloud 38 via appropriate interfaces. Each base station 32 provides communication and control with a plurality of mobile stations 30 over a radio interface in one or more cells. In FIG. 6, base station 32 is shown communicating with mobile station 30 in a representative cell illustrated with a dashed line.

Figure 7:
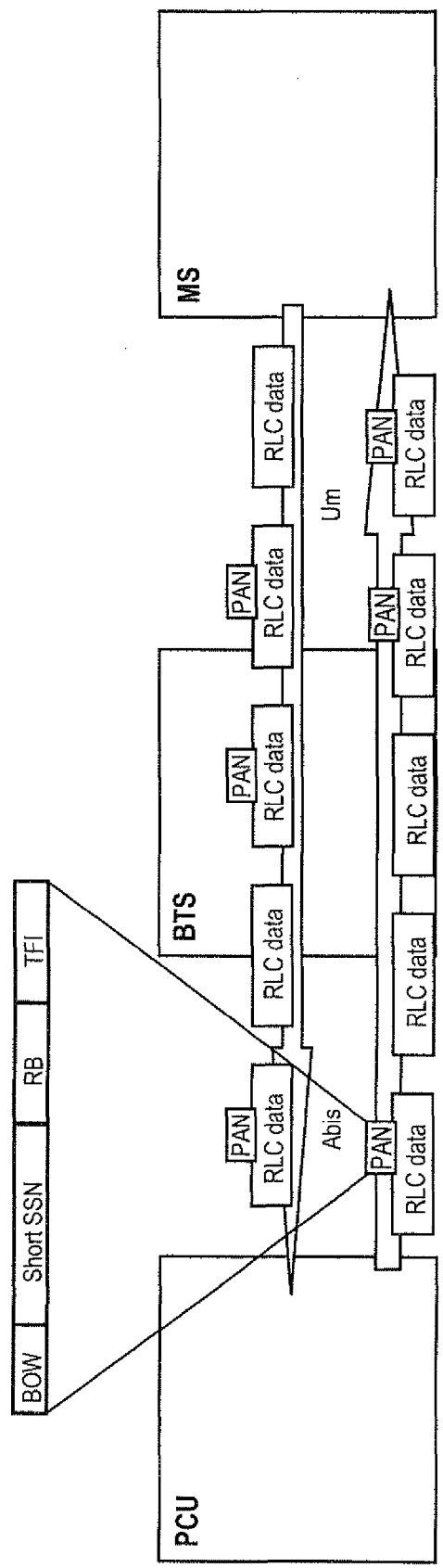
FIG. 7 is a diagram illustrating PAN reports piggy-backed onto the RLC data blocks in a radio communications system.

Reference is now made to the diagram in FIG. 7 which shows a packet control unit (PCU) (e.g., a PCU may be a part of a base station controller), communicating with a base transceiver station (BTS) and a mobile station (MS) using piggy-backed ACK/NACK (PAN) messages on radio link control (RLC) data blocks. Each PAN message includes 4 fields including a beginning of window (BOW) which may be one bit, a short starting sequence number (SSN), which may be 7 to 11 bits in length, a reported bitmap (RB) which may be 12 to 18 bits, and temporary flow identifier (TFI) which may be 5 bits. In order to fully appreciate the PAN report analysis, it is important to understand that the sending entity employs a transmit window and the receiving entity employs a received window.

Figure 8:
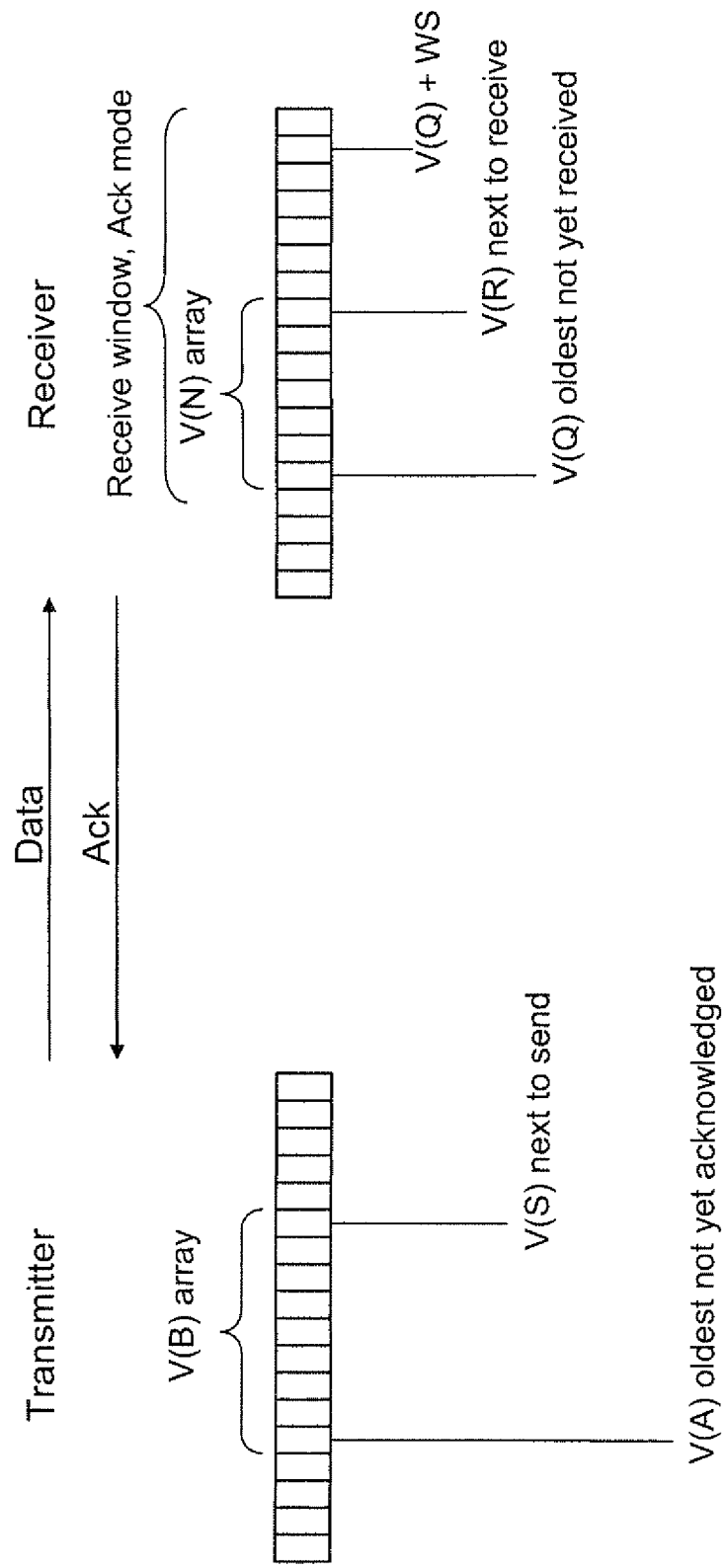
FIG. 8 illustrates example transmitter and receiver windows employed in data block transmission and PAN report transmission.

In this regard, reference is made to the diagram in FIG. 8 which shows example transmitter and receiver windows. As illustrated, the transmitter sends data to the receiver and the receiver acknowledges transmitted data blocks using ACK/NACK messages. In each transmit window, there is a predetermined number of data blocks, and in the Figure, the transmit window is represented as an array V(B). Data block V(A) in the array is the oldest already-transmitted data block in the window that has not yet been acknowledged by the receiver, and V(S) is the next data block to be transmitted by the transmitter to the receiver in the data window. On the receiver side, V(Q) is the oldest data block not yet received and V(R) is the next data block that should be received in the BSN sequence. V(Q) is the block that determines the beginning of the receive window. The window used cannot be larger than the applied window size (WS), and thus, V(Q) plus WS corresponds to the highest BSN that can be received. The window size (WS) is negotiated between transmitter and receiver at bearer setup.

Figure 9:
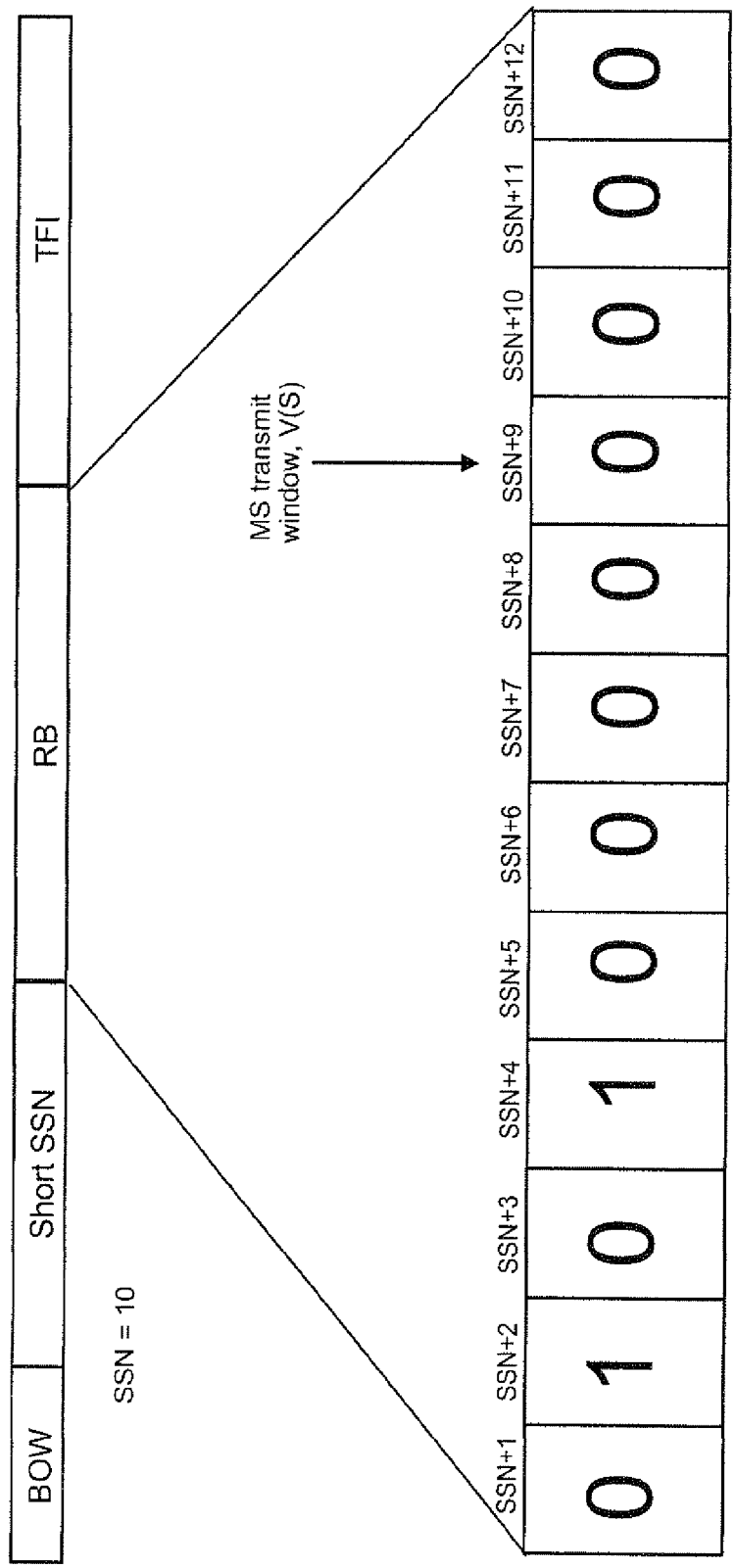
FIG. 9 is an example PAN report that illustrates the problem with the ACK/NACK analysis in the mobile station being linked to the base station's broadcast roundtrip time (RTT)

FIG. 9 is an example PAN report that illustrates the problem with the mobile station's ACK/NACK analysis being linked to/coupled with the base station's broadcast roundtrip time (RTT) as described in the background section above. This PAN message uses the example format described in FIG. 7 in which the short SSN is 10 and the reported bitmap (RB) includes 12 bits corresponding to the sequence numbers starting from the short SSN+1, which in this case includes SSN 11 through SSN 10+12=SSN 22.

A PAN message typically can only "tentatively acknowledge" a correctly-received data block. To fully acknowledge correct receipt of an RLC data block requires that the RLC data block be acknowledged in a proper control block (e.g., Packet Uplink ACK/NACK or (EGPRS) Packet Downlink ACK/NACK). This is because a PAN message usually does not have sufficient error protection, e.g., a strong enough checksum, for the level of reliability needed, and therefore, a PAN should not permanently acknowledge blocks. Accordingly, a tentative acknowledgement (ACK) for a correctly-received data block can be indicated with a 1 in the bitmap RB, and a 0 can be used to indicate an incorrectly or not received data block, corresponding to a NACK. In this example, the mobile's transmit window, V(B), ends at data block corresponding to SSN plus 8. This produces uncertainty with respect to the bits in the fields SSN+9 through SSN+12. As a result, it is unclear which bits in the bitmap are valid, and as a result, it is unclear what corresponding data blocks should be retransmitted by the mobile station. Although the mobile station has already transmitted data block 18 (SSN+8=18 is the last data block in the mobile's transmit window), it is uncertain which data blocks have actually been received by the base station and been processed in sufficient time to be included in this particular ACK/NACK bitmap RB. Recall the difficulties with the changing roundtrip times described in the background of the application. If the roundtrip is 0, a practical impossibility, then the mobile station should retransmit blocks 10, 11, 13, 15, 16, 17, and 18, corresponding to the bitmap fields labeled as 0. But in the more realistic case where the roundtrip time is something greater than 0, the decision of whether to re-transmit blocks 15, 16, 17, and 18 corresponding to data blocks outside of the mobile transmit window depends very much on the actual value of the often changing roundtrip time.

Figure 10:
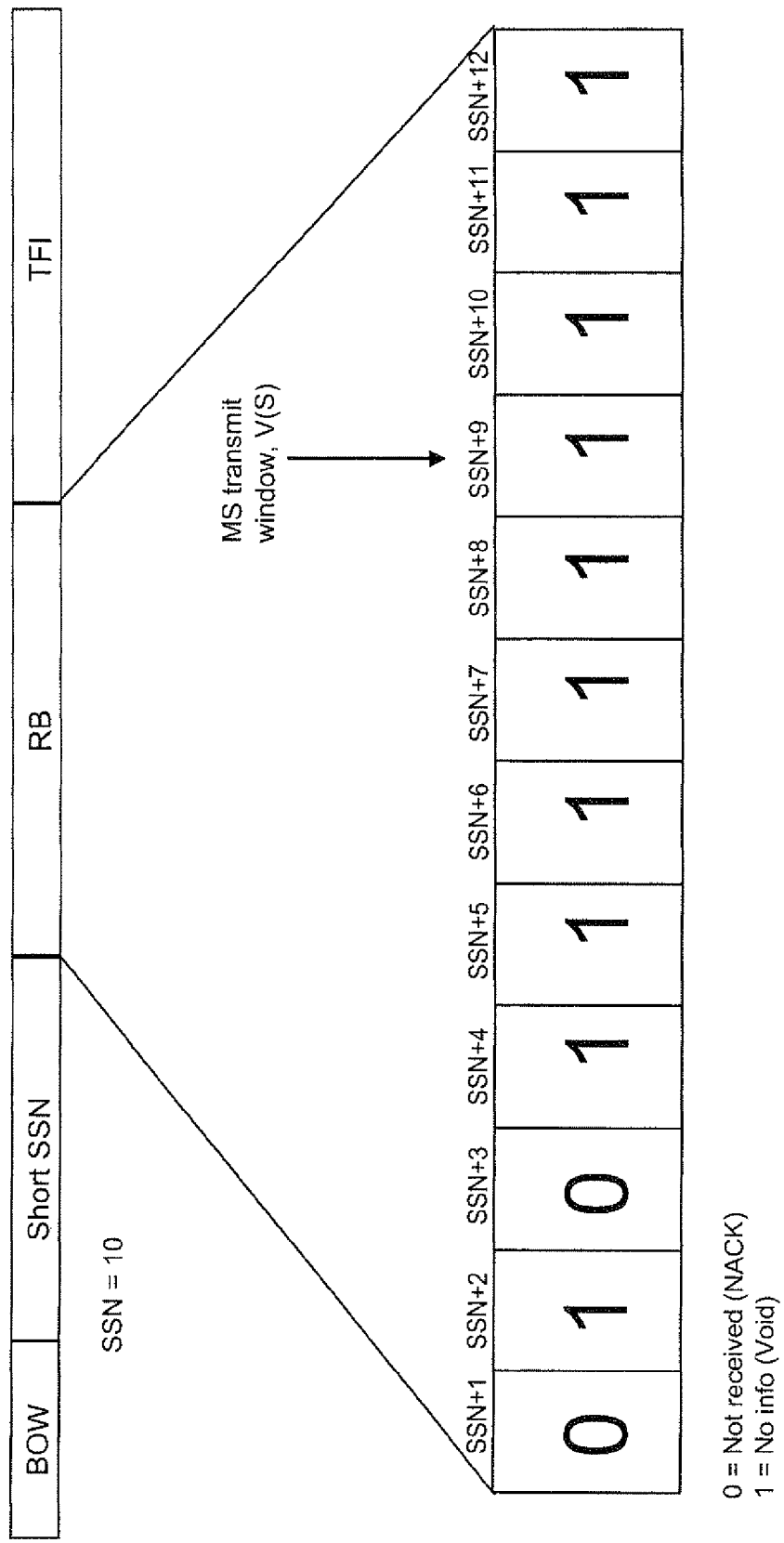
FIG. 10 is an illustration of an example PAN message in accordance with the technology described herein that may be used to decouple the roundtrip time from the ACK/NACK analysis.

FIG. 10 illustrates a solution to this problem. For data blocks that are not correctly received, a 0 is placed in the corresponding bit field for that data block. See, e.g., the fields for SSN+1 and SSN+3. However, for data blocks that are tentatively correctly received, such as SSN+2 and SSN+4, there is no information set to indicate that a data block is correctly received. Instead, a "1" in those bit fields means "void"—no ACK/NACK information for this data block. So the PAN message generator in the receiving node inserts "1's" for data blocks corresponding to the SSN+5-SSN+12, indicating that there is no ACK/NACK information for those blocks. The data block indicated by SSN in the PAN is implicitly NACKed. After receiving the PAN message, the mobile station knows that data blocks 10, 11, and 13 need to be retransmitted. The other data blocks indicated as void, i.e., 12 and 14-22, are left with an unchanged state, which means they are not re-transmitted as a response to this PAN message.

Thus, the solution shown in FIG. 10 eliminates the dependency of the bitmap from the accuracy of the roundtrip time broadcast by the base station. There is no need for the base station to continually update the current roundtrip time between the base station and the mobile station and periodically distribute that RTT to the mobile station through the broadcast channel. Instead, the base station simply determines which blocks are correctly received and which are not-correctly-received and generates the bits for the PAN bit field so that the tentatively correctly-received data blocks are marked as "void" and not-correctly-received blocks are marked as NACK. Void means that there is no ACK/NACK information. When the mobile station decodes the PAN message bit map, the mobile sets all of the NACK blocks from the bit field to be retransmitted and waits for the next ACK/NACK message with respect to the other data block identified in the bitmap as void.

Another way of expressing a non-limiting example implementation of the innovative technology in this application suitable for inclusion in a 3GPP standard GERAN type specification is provided below. Again, this is only an example and is not limiting in any way on the claims.

Interpretation of the Bitmap

If a compressed reported bitmap is received, the bitmap shall first be decompressed. The uncompressed bitmap shall then be treated as follows: Firstly, if the BOW bit in PACKET UPLINK ACK/NACK, EGPRS PACKET DOWNLINK ACK/NACK or EGPRS PACKET DOWNLINK ACK/NACK TYPE 2 message has the value '1', then the bitmap acknowledges all blocks between V(A) and (SSN−2) (modulo SNS), and the corresponding elements in V(B) shall be set to the value ACKED. Also a bitmap value of '0' is assumed at the bit position corresponding to (SSN−1) modulo SNS which corresponds to V(Q). If the BOW bit in MBMS DOWNLINK ACK/NACK message has the value '1', then the bitmap acknowledges all blocks between V(A) and (SSN−2) (modulo SNS), and a bitmap value of '0' is assumed at the bit position corresponding to (SSN−1) modulo SNS, only for the mobile station sending the message. The decision whether to set the corresponding elements in V(B) to the value ACKed is implementation specific.

Then, in case of PACKET UPLINK ACK/NACK, EGPRS PACKET DOWNLINK ACK/NACK or EGPRS PACKET DOWNLINK ACK/NACK TYPE 2 message, for each bit in the uncompressed bitmap whose corresponding BSN value is within the transmit window, if the bit contains the value '1', the corresponding element in V(B) indexed relative to SSN shall be set to the value ACKED. If the bit contains the value '0', the element in V(B) shall be set to the value NACKED. A bit within the uncompressed bitmap whose corresponding BSN is not within the transmit window, shall be ignored. In case of MBMS DOWNLINK ACK/NACK message, for each bit in the uncompressed bitmap whose corresponding BSN value is within the transmit window, if the bit contains the value '1', it positively acknowledges the corresponding RLC data block only for the mobile station sending the message, and the decision whether to set to the value ACKED the corresponding element in V(B) indexed relative to SSN is implementation specific. If the bit contains the value '0', it negatively acknowledges the corresponding RLC data block only for the mobile station sending the message, and the decision whether to set to the value NACKED the corresponding element in V(B) indexed relative to SSN is implementation specific. A bit within the uncompressed bitmap whose corresponding BSN is not within the transmit window shall be ignored.

If the EOW bit in the PACKET UPLINK ACK/NACK, EGPRS PACKET DOWNLINK ACK/NACK, or EGPRS PACKET DOWNLINK ACK/NACK TYPE 2 or MBMS DOWNLINK ACK/NACK message has the value '1', then bitmap value '0' shall be assumed for all RLC blocks with a BSN value higher than the last entry in the bitmap but less than V(S) (i.e. [V(R)−1<BSN<V(S)] modulo SNS).

If the RLC transmitter is on the mobile station side, the bit in the bitmap contains the value '0' and the number of block periods between the end of the block period used for the last transmission of the corresponding RLC data block and the beginning of the block period containing the PACKET UPLINK ACK/NACK message is less than (max(BS_CV_MAX,1)−1) (i.e. the RLC data block was recently (re)transmitted and thus can not be validly negatively acknowledged in this particular PACKET UPLINK ACK/NACK message), the element in V(B) shall not be modified. Similarly, if the RLC transmitter is on the network side and the RLC data block cannot be validly negatively acknowledged in this particular Packet Ack/Nack message the element in V(B) shall not be modified.

In the case of a PAN field, the bitmap shall be interpreted in the same way as for the case of PACKET UPLINK ACK/NACK, EGPRS PACKET DOWNLINK ACK/NACK or EGPRS PACKET DOWNLINK ACK/NACK TYPE 2 message with the following exceptions:

1—In RLC acknowledged mode and when the PAN is received by the network, elements of V(B) shall not be set to ACKED; any element which would be set to ACKED shall be set to TENTATIVE_ACK;

2—In the case when the PAN is received by the mobile station, the value '1' received in the reported bitmap shall not modify the current value of the corresponding element in V(B); the value '0' received in the reported bitmap shall set the corresponding element in V(B) to the value NACKED;

3—if the processing of a PAN would cause an element of V(B) to be changed from ACKED or TENTATIVE_ACK to NACKED, the entire PAN field shall be ignored;

4—if a PAN positively acknowledges a block which has not yet been transmitted (i.e. whose BSN is higher than or equal to V(S)) the entire PAN field shall be ignored;

5—if a time-based PAN indicates a reserved value the entire PAN field shall be ignored.

NOTE: Conditions 3-5 may arise due to undetected error in the PANI or in the PAN field.

Although not as easy to implement or as robust as the preferred solution described above, another possible solution is to have the base station update the MS more frequently and rapidly with new estimates of the current RTT. For example, in the GERAN standard, the BS_CV_MAX information could be made optional in the Packet Uplink ACK/NACK (PUAN) message so that base station can update the MS of changed RTT more frequently and rapidly.

Yet another possible solution to the problems described in the background is to change the definition of SSN so that the RB is always full with valid ACK/NACK bits. To do this, the SSN for a PAN is set to V(R) (next to receive) and the bitmap provides the status of lower BSNs. This removes the "open" zero bits in the end of the bitmap such as in bit positions SSN+9-SSN+12 in FIG. 9. Furthermore, a different value for the estimated RTT (BS_CV_MAX) is needed for PAN and PUAN, since the RTT of the mode of operation using PAN is lower than the mode of operation using just PUAN. If the RTT check using BS_CV_MAX remains, then the estimated RTT (BS_CV_MAX) must be differentiated between PAN operation mode and PUAN operation mode.

Although various embodiments have been shown and described in detail, the claims are not limited to any particular embodiment or example. None of the above description should be read as implying that any particular element, step, range, or function is essential such that it must be included in the scope of the claims. The scope of patented subject matter is defined only by the claims. The extent of legal protection is defined by the words recited in the allowed claims and their equivalents. Reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. It is not necessary for a device or method to address each and every problem sought to be solved by the present technology, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

What is claimed is:

1. A method in a mobile station for handling an acknowledgement (ACK)/negative acknowledgement (NACK) procedure, comprising:
   transmitting data blocks over a radio channel to a base station;
   receiving from the base station an acknowledgment status of the transmitted data blocks provided with a piggy-backed ACK/NACK (PAN) field carrying an array of first and second PAN values, wherein the status of each data block is represented with a PAN value, and wherein correctly received data blocks do not modify a current PAN value in the array and data blocks not correctly received by the base station are given the second PAN value in the array;
   setting the data blocks represented by the second PAN value in the array as NACKed, wherein setting of which data blocks to re-transmit is independent of a broadcasted parameter representing round trip time; and
   re-transmitting to the base station the data blocks set as NACKed.

2. The method of claim 1, wherein the broadcasted round trip time parameter is BS_CV_MAX.

3. The method of claim 1, wherein none of the data blocks represented by the first PAN value are set as ACKed.

4. A mobile station, comprising:
   a transmitter configured to transmit data blocks over a radio channel to a base station;
   a receiver configured to receive from the base station an acknowledgment status of the transmitted data blocks provided with a piggy-backed ACK/NACK (PAN) field carrying an array of first and second PAN values, wherein the status of each data block is represented with a PAN value, and wherein correctly received data blocks do not modify a current PAN value in the array and data blocks not correctly received by the base station are given the second PAN value in the array;
   a controller configured to:
      set the data blocks represented by the second PAN value as NACKed, and
      select and set which data blocks to re-transmit independently of a broadcasted parameter representing round trip time;
   the transmitter further being configured to re-transmit to the base station the data blocks set as NACKed.

5. A method in a base station for handling an acknowledgement (ACK)/negative acknowledgement (NACK) procedure, comprising:
   receiving data blocks over a radio channel from a mobile station;
   transmitting to the mobile station an acknowledgment status of the received data blocks provided with a piggy-backed ACK/NACK (PAN) field carrying an array of first and second PAN values, wherein the status of each data block is represented with a PAN value, and wherein correctly received data blocks do not modify a current PAN value in the array and data blocks not correctly received by the base station are given the second PAN value in the array;
   receiving from the mobile station re-transmitted data blocks set as NACKed by the mobile station, wherein the data blocks represented by the second PAN value in the array have been set as NACKed, and wherein the setting of which data blocks to re-transmit is independent of a broadcasted parameter representing round trip time.

6. The method of claim 5, wherein the broadcasted round trip time parameter is BS_CV_MAX.

7. A base station, comprising:
   a receiver configured to receive data blocks over a radio channel from a mobile station;
   a transmitter configured to transmit to the mobile station an acknowledgment status of the received data blocks provided with a piggy-backed ACK/NACK (PAN) field carrying an array of first and second PAN values, wherein the status of each data block is represented with a PAN value, and wherein correctly received data blocks do not modify a current PAN value in the array and data blocks not correctly received by the base station are given the second PAN value in the array;
   the receiver being further configured to receive from the mobile station re-transmitted data blocks set as NACKed by the mobile station, wherein the data blocks represented by the second PAN value in the array have been set as NACKed, and wherein the setting of which data blocks to re-transmit is independent of a broadcasted parameter representing round trip time.

* * * * *